United States Patent
Eakin (10) Patent No.: US 7,093,391 B2
(45) Date of Patent: Aug. 22, 2006

(54) PLANT POT DRAINAGE TRAY

(76) Inventor: Doyle W. Eakin, 4974 N. Fresno St., #162, Fresno, CA (US) 93726

( * ) Notice: Subject to any disclaimer, the term of this patent is extended or adjusted under 35 U.S.C. 154(b) by 0 days.

(21) Appl. No.: 10/656,714

(22) Filed: Sep. 4, 2003

(65) Prior Publication Data

US 2005/0050798 A1   Mar. 10, 2005

(51) Int. Cl.
A01G 9/04   (2006.01)
(52) U.S. Cl. .................. 47/71; 47/79; 47/65; 47/39
(58) Field of Classification Search ............ 47/79, 47/65, 65.5, 71, 65.6, 66.7, 39, 81, 62 R, 47/63, 62 E, 59 R, 66.6; D11/143, 152, D11/155, 154; 206/423; A01G 9/04
See application file for complete search history.

(56) References Cited

U.S. PATENT DOCUMENTS

| 117,766 | A | * | 8/1871 | Gibson ................. 220/23.83 |
| 132,808 | A | * | 11/1872 | Currier ................ 248/346.11 |
| 603,492 | A | * | 5/1898 | Waterer ................... 47/65.6 |
| 1,428,467 | A | * | 9/1922 | Loudon ...................... 47/71 |
| 1,631,802 | A | * | 6/1927 | Evert ....................... 47/65.5 |
| 2,072,185 | A | * | 3/1937 | Schein ........................ 47/81 |
| 2,989,205 | A | * | 6/1961 | Yaws ................... 248/346.11 |
| D245,241 | S | * | 8/1977 | Robinson ................. D11/155 |
| 4,183,176 | A | | 1/1980 | Barfield |
| 4,204,367 | A | | 5/1980 | Cone |
| 4,833,823 | A | * | 5/1989 | Edwards, III .............. 47/39 |
| 5,044,119 | A | * | 9/1991 | Hougard ..................... 47/75 |
| 5,052,149 | A | | 10/1991 | Johnson |
| 5,062,239 | A | | 11/1991 | Helton |
| 5,125,184 | A | | 6/1992 | Anderson |
| 5,220,745 | A | | 6/1993 | Elliott et al. |
| 5,299,384 | A | | 4/1994 | Andrews |
| 5,379,548 | A | | 1/1995 | Peterson |
| 5,409,510 | A | * | 4/1995 | Houweling ............... 47/62 C |
| D361,308 | S | * | 8/1995 | Loran ....................... D11/164 |
| 5,448,854 | A | | 9/1995 | Hirsch et al. |
| 5,782,035 | A | * | 7/1998 | Locke et al. ................. 47/79 |
| 6,047,499 | A | * | 4/2000 | Staas ........................... 47/71 |
| 6,125,580 | A | | 10/2000 | Fan |
| 6,279,265 | B1 | | 8/2001 | Scannell, Jr. |
| 6,289,632 | B1 | | 9/2001 | Boling |
| 6,385,899 | B1 | | 5/2002 | Treganza |
| 6,497,071 | B1 | | 12/2002 | Main et al. |

(Continued)

FOREIGN PATENT DOCUMENTS

JP   04158724   *   6/1992

(Continued)

Primary Examiner—Andrea M. Valenti
(74) Attorney, Agent, or Firm—Richard A. Ryan (57) ABSTRACT

A drainage tray suitable for use with plant pots is configured to collect and drain away excess plant treating fluids, such as water, fertilizer and the like, that drain from the plant pot. The drainage tray has a base member with a bottom having a side wall extending generally vertically from its periphery to form a reservoir with a generally open top and closed bottom. A drainage orifice in the base member connects to a tubular member, such as a hose, to drain the excess fluids from the reservoir to a suitable disposal site away from the area of the potted plant. Support members and stabilizer members are used to facilitate use of the drainage tray. The drainage tray prevents the accumulation of fluid near a potted plant that can damage or stain the deck, floor, sidewalk or other support surface and/or cause persons to slip and fall.

4 Claims, 4 Drawing Sheets

U.S. PATENT DOCUMENTS

| | | |
|---|---|---|
| 6,510,653 B1 | 1/2003 | Workum et al. |
| 2002/0017058 A1* | 2/2002 | Chung .......................... 47/79 |
| 2002/0035803 A1 | 3/2002 | Dummen |
| 2003/0009940 A1* | 1/2003 | Morlier et al. ................. 47/79 |
| 2005/0086863 A1* | 4/2005 | Brutsche et al. ............... 47/71 |

FOREIGN PATENT DOCUMENTS

| | | | |
|---|---|---|---|
| JP | 11289874 A | * | 10/1999 |
| JP | 2001112349 | * | 4/2001 |
| JP | 2001269072 | * | 10/2001 |

* cited by examiner

PLANT POT DRAINAGE TRAY

CROSS-REFERENCE TO RELATED APPLICATIONS

Not Applicable.

BACKGROUND OF THE INVENTION

A. Field of the Invention

The field of the present invention relates generally to apparatuses and systems for draining water away from potted plants. More specifically, the present invention relates to such apparatuses that are configured to receive and support standard plant pots that have a hole in the bottom of the plant pot to drain water from the plant. Even more specifically, the present invention relates to such apparatuses and systems that are adapted for the beneficial drainage of water away from a floor or deck where the potted plant is located.

B. Background

Many people place potted plants on or near a walkway, sidewalk, deck, floor, porch, patio or like places to improve the appearance of their home, office or business. Although plant pots come in a variety of different sizes and shapes, the vast majority of plant pots are configured in virtually the same way, that being a container having a hole or holes in or near the bottom of the pot as a drainage portal for the gravitational drainage of water from the plant. The drainage portals allow excess water, fertilizers, chemicals and other liquids (collectively the water and other liquids are referred to herein as "plant treating fluids") poured into the plant soil to advantageously drain out of the pot instead of building up in the pot and harming the plant (i.e., root rot and the like). While the addition of drainage portals to the standard plant pot has solved the problems associated with the build-up of plant treating fluids in the pot, it does create problems with regard to these fluids draining on the area where the potted plant is located. For instance, it is well known that these fluids can create falling hazards for people and animals moving on or across the area at or near where the pot is located (i.e. a sidewalk or deck). In addition, fluid draining from the plant pot can cause structural damage to the deck or other location where the plant pot sits. Even if the fluid does not directly cause damage, the water or the soil, fertilizer or chemicals carried by the water can stain the sidewalk, deck or other location where the potted plant is located. As is well known, these stains can be very difficult to remove.

Because of the problems with water draining directly on the location where the potted plant sits, most persons utilize a saucer-like plate or tray (i.e., a "pot tray") to catch and contain the plant treating fluids. The typical pot tray has an upstanding rim portion that keeps a certain amount of fluid from spilling out over the rim until it either evaporates away, is pulled back into the plant pot by capillary action or is manually removed (i.e., by emptying the fluid in a sink, on the ground or back into the potted plant). Generally, however, these fluids are not manually removed from the pot tray. As a result, it is not uncommon at all for fluid to be left standing in the pot tray for some time. If the water is there when the plant is watered again, the additional drainage fluid can cause the pot tray to overflow, resulting in spillage of fluid onto the deck or other surface, creating the very problems that were intended to be avoided by using the pot tray. Another problem with standing fluid being left in the pot tray is that it provides a breeding ground for bacteria, mosquitoes and other pests. At a time when mosquitoes are known to transmit the West Nile Virus and other diseases, people generally do not want to have standing, stagnated fluid suitable for breeding mosquitoes in areas where they or their children may be walking, sitting or playing. Even if mosquitoes are not a problem, the stagnated fluid, containing fertilizer and chemicals, can damage the pot, pot tray and/or result in undesirable smells emanating from the potted plant.

Due to the aforementioned problems, it has been known for some time that it is desirable to have a potted plant system that prevents fluid from spilling onto the area where the plant is located or accumulating in a pot tray. Various apparatuses and systems have been developed to facilitate drainage of fluid away from the potted plant. Most of these are passive in that they rely on the uptake of the fluid back into the plant pot by capillary action of the plant's root system. Unfortunately, this type of system does not prevent the spillage of fluid when there is too much for the underlying tray and, even when there is no spillage problem, the process is generally too slow to avoid the problems associated with standing fluid. Some systems rely on pumps or other devices to circulate the excess fluid back into the plant's soil, either at a planned interval or when the soil is measured to be dry enough to accept more water. Some of these apparatuses and systems have been the subject of patent applications. For example, U.S. Pat. No. 6,289,632 to Boling describes a plant drainage system that utilizes an apparatus that fits into or adjacent to the drainage portal at the bottom, underside of the plant pot. The apparatus requires a mechanism, such as blocks or a hole in the deck, to support the plant pot in a manner that allows for drainage through the bottom drainage portal. U.S. Pat. No. 5,125,184 to Anderson describes a jacketed nursery plant container assembly that utilizes an inner container for the plant, an exterior jacket surrounding the container and a base plate which supports the container above its bottom. One or more wicks extend through openings in the container to pull in water from the reservoir formed by the peripheral wall around the base plate. U.S. Pat. No. 5,062,239 to Helton and U.S. Pat. No. 5,052,149 to Johnson describe apparatuses and methods for capturing the drainage overflow resulting from the watering of hanging plants. U.S. Pat. No. 5,299,384 to Andrews describes a self-draining plant pot having filter assembly partially enclosed in a sidewall of the plant pot that drains the water down to a preselected level in the pot.

Although the prior art discloses a number of plant watering or drainage apparatuses, there are certain characteristics of the known apparatuses that limit their complete acceptance, usefulness and/or cost effectiveness. For instance, it is well known that the apparatuses that do not provide for the draining away of fluid from the plant pot or pot tray are subject to the aforementioned problems with regard to fluid spillage or standing fluid. In addition, the apparatuses that are configured to allow fluid to wick into the plant pot are not configured to drain the fluid away. Those apparatuses that do provide for plant pot drainage either do not, because of their configuration, completely drain away the fluid or require a non-attractive support mechanism or holes in the floor or deck upon which the plant pot rests in order to be effective. What is needed, therefore, is a combined plant pot drainage tray that substantially transports away the plant treating fluids that drain from a plant pot and which is adaptable to a variety of different sized and configured plant pots. The plant pot drainage tray should not require any modification to the floor, deck or other location where the plant pot is utilized and be configured to allow the owner or caretaker to move the plant pot and drainage tray as needed or desired.

Preferably, such an apparatus should be relatively inexpensive to manufacture, simple to utilize and allow the owner/caretaker to relatively easily clean the drainage tray as may be necessary or desired.

SUMMARY OF THE INVENTION

The plant pot drainage tray of the present invention solves the problems and provides the benefits identified above. That is to say, the present invention discloses a drainage tray and system particularly configured to transport plant treating fluids away from the drainage portal of a standard plant pot so as to avoid those fluids overflowing onto the deck, floor or other area where the plant pot sits and the problems associated with standing fluid in conventional pot trays. The plant pot drainage tray of the present invention can be made out of a wide variety of materials and in a wide variety of shapes and sizes. In the preferred embodiment, the plant pot drainage tray is easily moved with the plant pot, requires no modification to standard plant pots and/or to the floor, deck or other area where such the plant tray may be utilized. The preferred plant pot drainage tray is easily separated from the plant pot so the owner or caretaker can clean it as necessary.

In one aspect of the present invention, the plant pot drainage tray has a base member configured with a bottom having an upwardly facing surface and a downwardly facing surface and one or more side walls that extend generally vertically upward from the periphery edge of the bottom. The bottom and the side walls form a reservoir in the base member for the collection of excess plant treating fluids or drainage fluids from the plant pot. The reservoir has a generally open top portion that is placed under the hole or other opening in the bottom of the plant pot. A drainage orifice is disposed in the base member such that the orifice inlet is disposed in the reservoir and its outlet is disposed outside of the reservoir. One end of a tubular member connects to the drainage orifice to receive the fluids from the reservoir through the outlet of the drainage orifice. The other end distributes the drainage water to the desired disposal location, such as grass, bushes, flowerbed and the like.

In the preferred embodiment, the upwardly facing surface of the bottom of the base member is generally concave to facilitate flow of the fluids in the reservoir to the orifice inlet, which is preferably located at or near the bottom of a side wall with the outlet extending outwardly from the base member. Also in the preferred embodiment, the upwardly facing surface of the base member bottom has one or more upper supports that extend generally upward from the bottom to support the plant pot a spaced distance above the bottom of the base member. The upper supports can comprise a plurality of ribs in spaced apart relation that are inclined generally downward toward the center of the bottom and configured to allow flow of the fluids in the reservoir to the drainage orifice. The base member can be made out of molded plastic with the drainage orifice made integral with the base member. In an alternative embodiment, the drainage orifice can comprise a connector disposed in the base member and configured to interconnect the reservoir with the tubular member so as to drain the fluids from the reservoir. The downwardly facing surface of the bottom can have one or more stabilizer members that extend generally downward from the bottom of the base member. The stabilizer members can comprises at least an inner stabilizer member and an outer stabilizer member that are sized and configured to generally support the center of the base member bottom higher than its periphery.

Accordingly, the primary objective of the present invention is to provide an improved plant pot drainage tray that provides the advantages discussed above and that overcomes the disadvantages and limitations associated with presently available plant pot drainage apparatuses and systems.

It is also an important objective of the present invention to provide a plant pot drainage tray that effectively transports away plant treating fluids that drain from a plant pot through one or more drainage portals in the plant pot so as to substantially prevent spillage of fluid around the plant pot and standing fluid in the drainage tray.

It is also an important objective of the present invention to provide a plant pot drainage tray that is configured to receive or support plant pots of various sizes and configuration in a manner that facilitates transport of the drainage fluid away from the plant pot.

It is also an important objective of the present invention to provide plant pot drainage tray having a base member with an upstanding peripheral side wall configured to support a plant pot, a drain orifice in the wall for connecting to a drainage hose suitable for transporting the plant pot drainage fluid away from the plant pot and drainage tray, and one or more angled support members on the inside bottom of the base member for supporting a pot plant inside the drainage tray.

The above and other objectives of the present invention will be explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, and particularly with reference to the embodiments of the plant pot drainage tray of the present invention illustrated in the figures, the preferred embodiments of the present invention are set forth below. The enclosed figures and drawings are merely illustrative of the preferred embodiments and represent several different ways of configuring the present invention. Although specific components, materials, configurations and uses of the present invention are illustrated and set forth in this disclosure, it should be understood that a number of variations to the components and to the configuration of those components described herein and in the accompanying figures can be made without changing the scope and function of the invention set forth herein.

Figure 1:
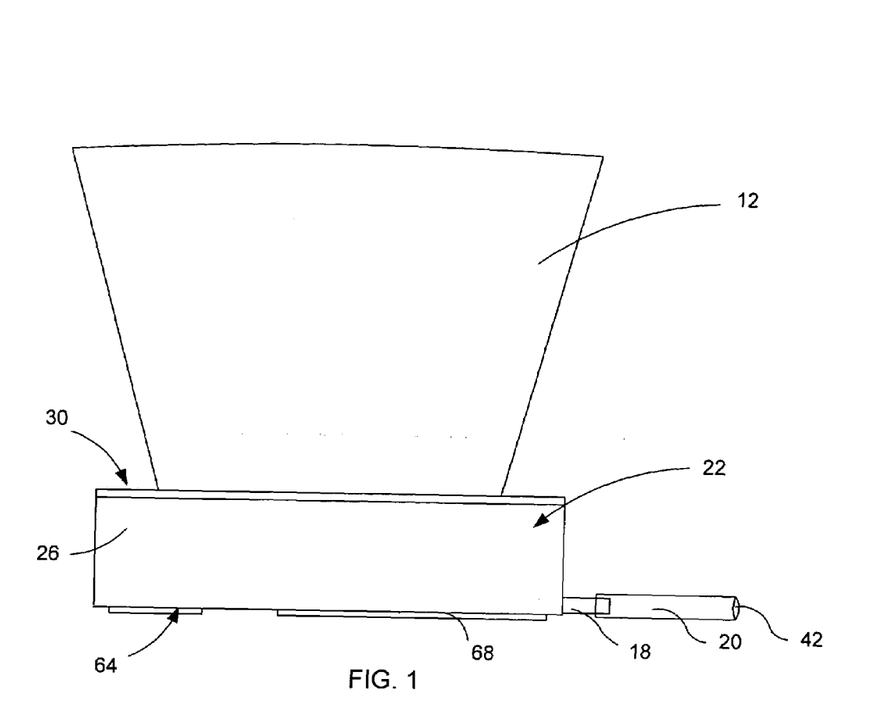
FIG. 1 is a side view of the plant pot drainage tray of the present invention with a plant pot sitting inside the tray compartment.
Figure 2:
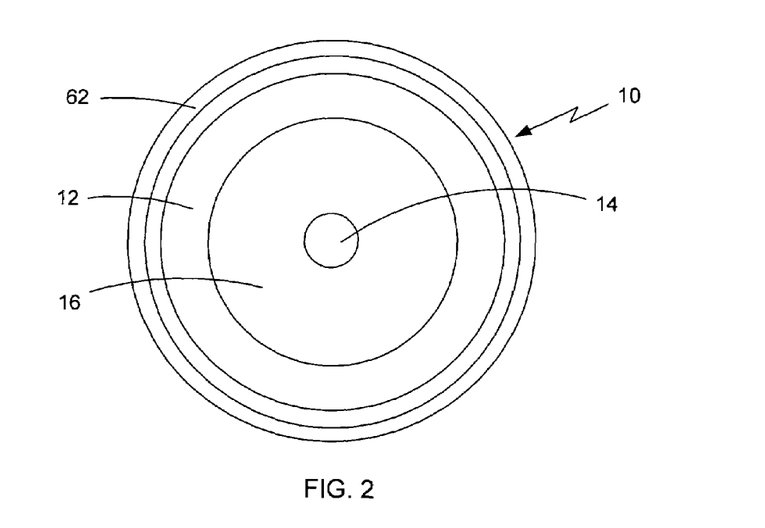
FIG. 2 is a top plan view of the plant pot and plant pot drainage tray of FIG. 1.
Figure 3:
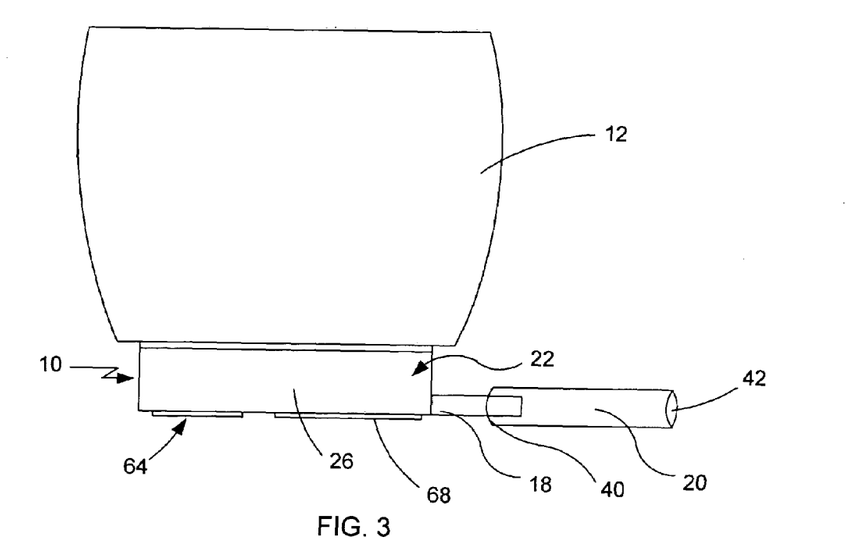
FIG. 3 is a side view of the plant pot drainage tray of the present invention with a plat pot sitting on top of the sides of the drainage tray.

The plant pot drainage tray of the present invention, identified generally as 10 in the figures, is utilized with a plant pot or container 12 that is substantially filled with soil, potting medium or other material (not shown) for biologically supporting one or more plants (not shown). As shown in FIG. 2, a plant pot 12 suitable for use with drainage tray 10 of the present invention has a substantially vertically extending drainage portal or hole 14 in its bottom portion 16 for gravity drainage of plant treating fluids into drainage tray 10. As is well known, the excess fluid that drains from plant pot 12 will generally carry with it soil, fertilizer, chemicals and other solid or dissolved materials from plant pot 12. As set forth in more detail below, plant pot 12 can be received in drainage tray 10 or sit on top of drainage tray 10, as shown in FIGS. 1 and 3 respectively. To facilitate transport of the drainage fluid, and any materials carried by the fluid, away from plant pot 12 and the floor, deck, sidewalk or other area around it, the plant pot drainage tray 10 of the present invention includes a drainage orifice 18 that attaches to a generally elongated tubular member 20. Drainage orifice 18 and tubular member 20 should have a sufficient inside diameter, in the case of a round tubular member 20, to permit the fluid and the materials carried by it to easily flow into and through tubular member 20. Tubular member 20 can be made into any length desirable or necessary to transport the drainage fluids a sufficient distance away from plant pot 12 and its surrounding area. Generally, it will be desired to transport the drainage fluid from plant pot 12 to a disposal site suitable for the plant treating fluids, such as any nearby grass, bushes, soil or other landscaping area that can beneficially utilize the drainage fluid.

A variety of different materials are suitable for tubular member 20, including a flexible, transparent plastic or rubber hose or such a hose that is colored to blend in with the surrounding area (i.e., a reddish-brown color for use over redwood decking). Preferably, tubular member 20 is made out of material that is suitable for use in outdoor environments, such that it will not be easily damaged by exposure to sun, rain, snow or other weather-related conditions. For instance, it is desirable that tubular member 20 be sufficiently resistant to ultraviolet light. In addition, tubular member 20 is preferably sufficiently strong such that it will not be damaged (i.e., crushed) if someone inadvertently steps on or places something on top of tubular member 20. It is also desirable that tubular member 20 be substantially flexible to allow tubular member 20 to be directed to the desired disposal site. However, as used herein, the term "tubular member" includes tubes, pipes, hoses and the like, whether rigid, semi-rigid or flexible. Drainage orifice 18 and tubular member 20 should be cooperatively sized such that a tight seal is provided between drainage orifice 18 and tubular member 20. In the preferred embodiment, as explained in more detail below, tubular member 20 removably attaches to drainage orifice 18 so that it may be repaired or replaced as necessary or desired.

Figure 4:
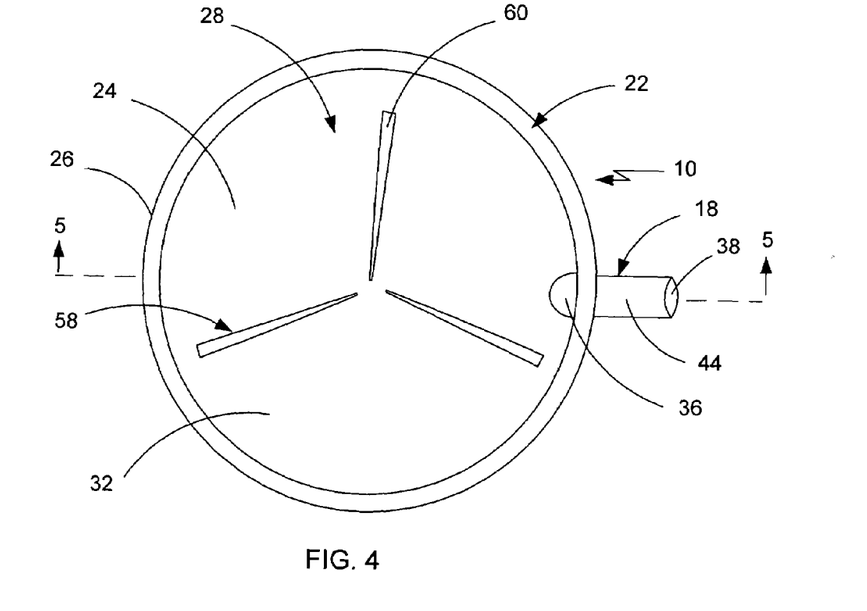
FIG. 4 is a top plan view of one embodiment of the plant pot drainage tray of the present invention.
Figure 5:
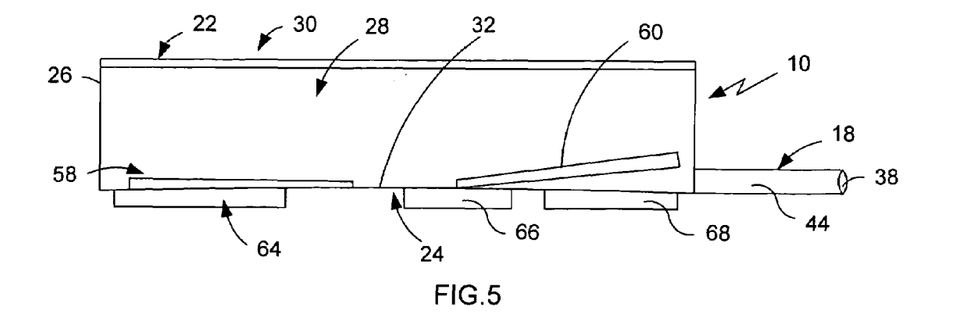
FIG. 5 is a side section view of the plant pot drainage tray of FIG. 4 taken through lines 5—5.
Figure 6:
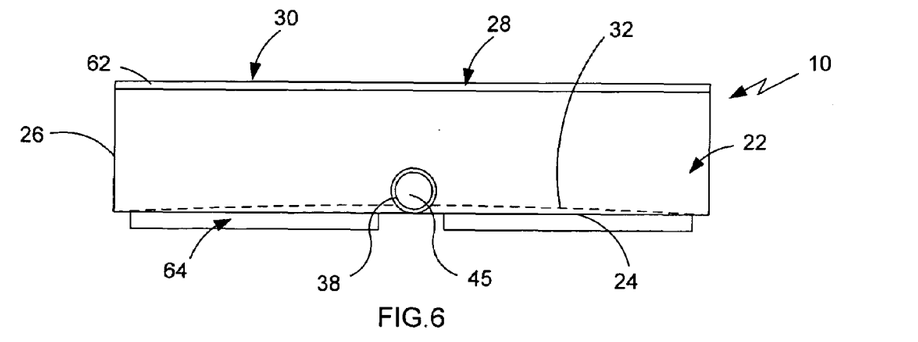
FIG. 6 is a side view of the plant pot drainage tray of FIG. 4 showing the hose connector opening into the tray compartment.

As best shown in FIGS. 4 through 6, drainage tray 10 comprises a base member 22 having a bottom 24 with a peripherally arranged, generally upstanding side wall 26 that forms an interior tray compartment or reservoir 28 having a generally open top 30 in which plant treating fluids drain from plant pot 12 through hole 14. In one configuration, best shown in FIGS. 2 and 4, base member 22 is configured in a generally circular shape. As those skilled in the art will know, base member 22 can be configured in a variety of different shapes and sizes depending on the desired shape and/or size of plant pot 12 desired to be utilized with drainage tray 10. Alternatively, one size and shape of drainage tray 10 can be utilized for a wide variety of sizes and configurations for plant pots 12. Base member 22 can be made out of a variety of different materials, including plastics, wood, clay, metal, composites, fiberglass and other materials that are suitable for supporting plant pot 12 as described herein. In one embodiment, base member 22 is made out of plastic material that is suitable being manufactured by molding processes. If desired, base member 22 can be made out of a material that is suitable for painting or otherwise decorating. Alternatively, base member 22 can be made out of material that is itself in a design. In a preferred embodiment, base member 22 is made out of a molded plastic that is molded in the shape, color and configuration typical of the standard clay or clay-type drainage trays. If desired, natural or colored gravel or sand can be placed inside drainage tray 10 and plant pot 12 placed on top of that gravel or sand.

Figure 7:
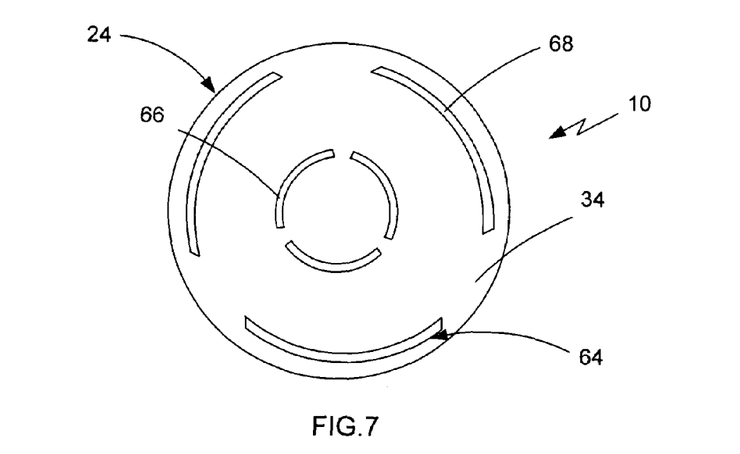
FIG. 7 is a bottom plan view of one embodiment of the plant pot drainage tray of the present invention.

Bottom 24 of base member 22 has an upwardly facing surface 32 and an opposite directed downwardly facing surface 34, as best shown in FIGS. 4, 5 and 7. In the preferred embodiment, bottom 24 of base member 22 is configured such that upwardly facing surface 32 is concaved, with the high point being at or near the center of bottom 24 and the low point being at or near the intersection of bottom 24 and side wall 26 so that any fluids in interior tray compartment 28 will gravitationally flow toward this intersection and out drainage orifice 18. Preferably, inlet 36 of drainage orifice 18 is located at or near the bottom of side wall 26 so that excess plant treating fluids draining from plant pot 12 will gravitationally flow across the concave bottom 24 to inlet 36, flow through orifice 18, discharge from outlet 38 into the open first end 40 of tubular member 20 and then through open second end 42 to the desired disposal site. First end 40 of tubular member 20 is sized and configured to engage the outlet 38 of orifice 18 and second end 42 is sized and configured to discharge fluids in or on the grass, bushes, plants, trees or the like at the disposal site.

In a preferred embodiment, best shown in FIGS. 4 and 5, orifice 18 is molded as an integral part of base member 22 such that inlet 36 extends into reservoir 28 and outlet 38 extends outside of base member 22, with the tubular body portion 44, having a generally cylindrical passageway 45 in the preferred embodiment, of orifice 18 extending therebetween to allow fluid to flow from inside reservoir 28 to tubular member 20. As known to those skilled in the art, it is preferred that inlet 36 be configured to be generally planar relative to the bottom 24 and side wall 26 of base member 22 to facilitate the flow of fluids into tubular body portion 44 and then to tubular member 20. As also known, outlet 38 should be sized and configured to be tightly received by first end 40 of tubular member 20 or to tightly receive first end 40 so as to prevent the leakage of fluids out of the connection between tubular member 20 and orifice 18. Although the outside surface of tubular body portion 44 can be configured to be smooth, as shown in the figures, to facilitate the connection between tubular body portion 44 and first end 40 of tubular member 20, the outer surface of tubular body portion 44 can have one or more barbs or threads that can effectively "grab" onto the interior of first end 40 of tubular member 20. In an alternative embodiment of the drainage tray 10 of the present invention, shown in FIGS. 8 and 9, orifice 18 can comprise a removable connector 46 that is disposed in an opening in side wall 26 to function as a transition component between base member 22 and tubular member 20. Connector 46, shown separately in FIG. 9, can have a fixed nut 48 that abuts the outside of side wall 26 with the outlet end 50 of tubular body portion 44 having barbs 52 thereon for grabbing onto first end 40 of tubular member 20 and a removable nut 54 that is received on threaded end 56 and tightened until it abuts the inside of side wall 26. Threaded end 56 is inserted into the opening until fixed nut 48 abuts side wall 26 and then removable nut 54 is threaded onto threaded end 56 and tightened against the inside of side wall 26 to fix orifice 18 in place.

As shown in FIGS. 1 and 2, certain sizes of plant pot 12 can sit inside reservoir 28. To facilitate supporting plant pot 12 and the drainage of fluids from plant pot 12 to drainage tray 10, the bottom 24 of base member 22 can comprise one or more upper supports 58 configured to engage the underside of plant pot 12 and support plant 12 a spaced distance vertically above bottom 24 of base member 22. In the preferred configuration, upper supports 58 comprises a plurality of spaced apart, upwardly extending ribs 60, as best shown in FIG. 4, disposed on bottom 24. Preferably, ribs 60 do not extend entirely from the center of bottom 24 to the peripheral edge of bottom 24, where bottom 24 meets side wall 26. As shown in FIG. 4, the use of an gap in the center underneath where the hole in plant pot 14 would be located and a gap at between the bottom 24 and side wall 26 interface facilitates the flow of fluids from plant pot 12 to inlet 36 of orifice 18 and into tubular member 20. In the preferred embodiment, ribs 60 are inclined, as shown in FIG. 5, from their periphery end down toward the center end to better support different sized plant pots 12. As shown in FIG. 3, in some circumstances it will be preferred to support plant pot 12 on the side wall 26 of base member 22. To facilitate such use, the upper marginal surface 62 of side wall 26 can be sized and configured to better support plant pot 12 (i.e., surface 62 can be made wider or thicker than the side wall 26 itself).

To better support drainage tray 10 above the ground, deck, sidewalk or other support area where used with plant pot 12, downwardly facing surface 34 of bottom 24 can comprise one or more stabilizer members 64 suitably sized and configured to facilitate drainage of fluids into tubular member 20 and provide a spaced distance vertically above the support area. In one configuration, shown in FIG. 7, stabilizer members 64 comprises a plurality of downward extending, spaced apart inner stabilizer members 66 and outer stabilizer members 68 on the downwardly facing surface 34 of base member 22 that are sized and configured to beneficially support drainage tray 10 so as to facilitate drainage of excess fluids through tubular member 50. In the preferred embodiment, inner stabilizer members 66 extend downward further than outer stabilizer members 68 such that when plant pot 12 is placed in or on drainage tray 10, as shown in FIGS. 1 and 3, the center portion of base member 22 will be kept above the periphery edge of bottom 24 to facilitate drainage of fluid to inlet 36 and the fluid flowing through tubular member 20. Both inner 66 and outer 68 stabilizer members should be sufficiently sized (i.e., ⅛ of an inch or more) to allow the user to wash the surface under drainage tray 10 and to permit the surface to dry (i.e., air dry), particularly if the surface is a wood decking or similar material. The vertical space above the support area created by stabilizer members 64 also facilitates the placement of orifice 18 at the lowest point in reservoir 28 so that it may be fully drained through tubular member 20.

In one configuration of drainage tray 10 of the present invention, base member 22 is made out of a molded plastic material with orifice 18 made integral therewith and having a generally flat, smooth inlet 36 and a smooth outer surface for tubular body portion 44 leading to outlet 38. The outside diameter of base member 22 can be provided in different sizes, such as eight and ten inch drainage trays 10, to allow use with different sized plant pots. Side wall 26 can be made approximately one inch high with a upper marginal surface of ⅛th of an inch. Tubular member 20 can be a clear plastic hose approximately one foot long with an outside diameter of ⅝ths to ¾ths of an inch and an inside diameter of ½ to ⅝ of an inch, or otherwise sized to snugly fit over outlet 38 of orifice 18. Because no pressure is generated in reservoir 28, it is generally not necessary to utilize the barbs 52 or other grabbing mechanisms described above. As shown in FIG. 4, three ribs 60 can be utilized on upwardly facing surface of bottom 24 of base member 22 to support a plant pot 12. An inner stabilizer member 66 of 3/16 of an inch and an outer stabilizer member 68 of 3/32 of an inch can be placed on the downwardly facing surface 34 of base member 22, as shown in FIG. 7. Depending on the size of plant pot 12, it can be placed inside reservoir 28 or placed on top of upper marginal surface 62 of side wall 26, as shown in FIGS. 1 and 3.

Figure 8:
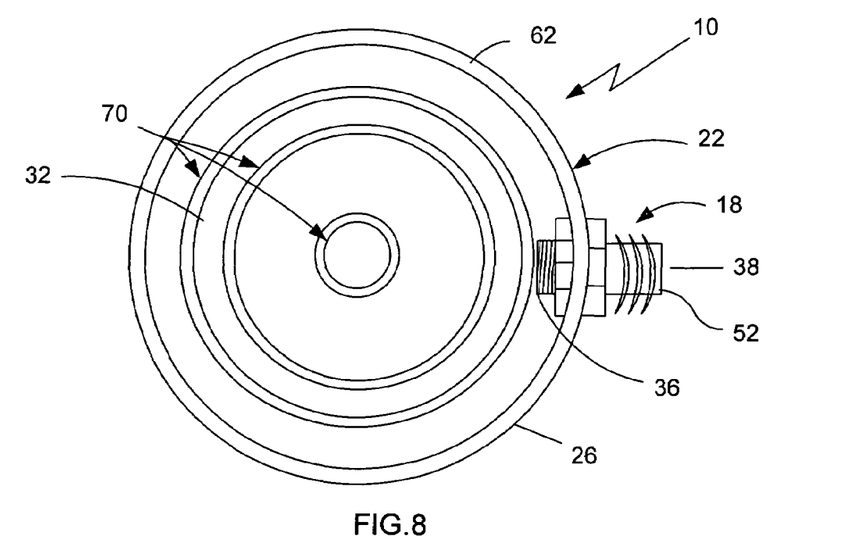
FIG. 8 is a top plan view of an alternative embodiment of the plant pot drainage tray of the present invention.
Figure 9:
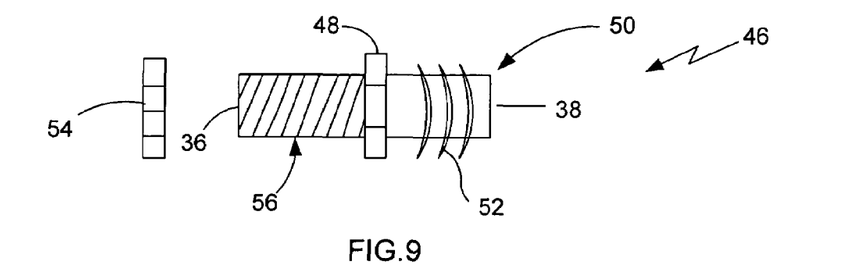
FIG. 9 is an isolated view of an alternative hose connector for use with the embodiment of the plant pot drainage tray of FIG. 8.
Figure 10:
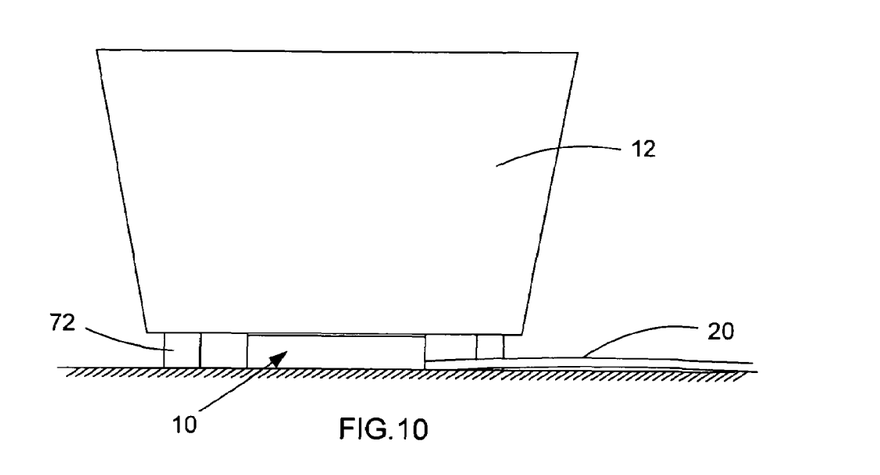
FIG. 10 is a side view of an alternative usage of the plant pot drainage tray of the present invention.

In an alternative configuration, shown in FIG. 8, upper supports 58 can comprise a series of raised ring members 70 on upwardly facing surface 32 of bottom 24 that are even in height or which vary in height from the high side being near the middle of bottom 24 to the ring nearer the periphery of bottom 24 being lower. A similar ring configuration can be utilized for stabilizer members 64 on the downwardly facing surface 34 of bottom 24 to support drainage tray 10 above the support surface (i.e., deck, sidewalk, porch, etc.). As known by those skilled in the art, various other configurations are possible for upper supports 58 and/or stabilizer members 64. In another configuration, shown in FIG. 10, even very large plant pots 12 can be utilized with drainage tray 10 of the present invention by utilizing one or more pot support members 72 that are sized and configured to fit under plant pot 12. In a preferred configuration, pot support members 72 are sized and configured to hold the weight of plant pot 12 completely off of drainage tray 10, such that drainage tray 10 is removably placed under hole 14 in the bottom portion 16 of plant pot 12. In this configuration, drainage tray 10 can be utilized with plant pots weighing hundreds of pounds. In another configuration, pot support members 72 are sized and configured such that drainage tray 10 helps support plant pot 12 (in this configuration, drainage tray 10 is not easily removable).

In use, the user of drainage tray 10 merely decides where he or she wants plant pot 12 to be located and places drainage tray 10 at that location such that it will be generally positioned under hole 14 in the bottom portion 16 of plant pot 12. The distance to the desired disposal area for the drainage fluids that will drain from plant pot 12 is computed and a tubular member 20 of the correct diameter to connect to orifice 18 and of sufficient length is selected or cut to size. In one configuration, tubular member 20 is a clear plastic tube that is of the type that is commonly found for easy replacement if it becomes dirty, broken, clogged or otherwise undesirable to use. First end 40 of tubular member 20 is connected to the body portion 44 of orifice 18 and the second end 42 is directed to the desired disposal site for the drainage fluids. As plant treating fluids are placed inside plant pot 12, any excess fluids will drain into reservoir 28, flow across bottom 24 into inlet 36 or orifice 18, out outlet 38 to the tubular member 20, and then be disposed of away from plant pot 12.

While there are shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape and use.

What is claimed is:

1. In combination with a plant pot having a drainage hole in a bottom portion thereof, a drainage tray for draining plant treating fluids from said plant pot comprising:

a base member having a bottom with one or more side walls extending generally vertically upward from the periphery thereof, said bottom and said one or more side walls forming a reservoir in said base member for the collection of the fluids from the plant pot, said reservoir having a generally open top portion, said bottom of said base member having an upwardly facing surface and a downwardly facing surface, said upwardly facing surface is concave such that the center of said bottom is higher than the periphery of said bottom to facilitate flow of fluids in said reservoir to said one or more side walls, said one or more side walls having an upper marginal surface thereon, said upper marginal surface configured to support the plant pot thereon;

one or more stabilizer members on said downwardly facing surface of said bottom, said one or more stabilizer members extending generally downward from said bottom, said one or more stabilizer members sized and configured to generally support the center of said bottom higher than the periphery of said bottom;

a drainage orifice in said base member at the intersection of said bottom and one of said one or more side walls, said drainage orifice having an inlet disposed in said reservoir and an outlet disposed outside of said reservoir; and a tubular member connected to said drainage orifice to receive the fluids from said reservoir through said outlet of said drainage orifice.

2. The drainage tray according to claim 1 further comprising one or more upper supports on said upwardly facing surface of said bottom, said one or more upper supports extending generally upwardly from said bottom to support the plant pot a spaced distance above said bottom of said base member, said one or more upper supports generally inclined downward toward the center of said bottom.

3. The drainage tray according to claim 1, wherein said drainage orifice is disposed in one of said one or more side walls of said base member, said outlet of said drainage orifice extending outwardly from said base member.

4. The drainage tray according to claim 1, wherein said one or more stabilizer members comprise at least an inner stabilizer member and an outer stabilizer member, each of said inner stabilizer member and said outer stabilizer member configured in a generally circular pattern, said inner stabilizer member disposed generally inwardly of said outer stabilizer member, said inner stabilizer member configured to generally support the center of said bottom higher than the periphery of said bottom.

* * * * *